(12) United States Patent
Haumonte

(10) Patent No.: US 10,866,333 B2
(45) Date of Patent: Dec. 15, 2020

(54) CONTROLLING THE DEPTH OF A SEISMIC CABLE

(71) Applicant: KIETTA, Marseilles (FR)

(72) Inventor: Luc Haumonte, Marseilles (FR)

(73) Assignee: KIETTA, Marseilles (FR)

( * ) Notice: Subject to any disclaimer, the term of this patent is extended or adjusted under 35 U.S.C. 154(b) by 145 days.

(21) Appl. No.: 15/353,450

(22) Filed: Nov. 16, 2016

(65) Prior Publication Data

US 2017/0139068 A1 May 18, 2017

(30) Foreign Application Priority Data

Nov. 17, 2015 (FR) ..................................... 15 61077

(51) Int. Cl.
| | | |
|---|---|---|
| *G01V 1/38* | (2006.01) | |
| *B63B 21/66* | (2006.01) | |
| *G01V 1/20* | (2006.01) | |

(52) U.S. Cl.
CPC ............ *G01V 1/3817* (2013.01); *B63B 21/66* (2013.01); *G01V 1/3826* (2013.01); *G01V 1/3808* (2013.01); *G01V 1/3835* (2013.01); *G01V 2001/204* (2013.01); *G01V 2001/207* (2013.01)

(58) Field of Classification Search
CPC .............................. G01V 1/3826; B63B 21/66
USPC ........................................................... 367/18
See application file for complete search history.

(56) References Cited

U.S. PATENT DOCUMENTS

| | | |
|---|---|---|
| 3,359,536 A | 12/1967 | Coburn |
| 3,436,776 A | 4/1969 | Davis |
| 3,675,607 A * | 7/1972 | Dorschel .................. B63C 11/36 114/314 |
| 3,698,348 A * | 10/1972 | Morgan ..................... F16L 1/165 114/245 |
| 3,953,827 A | 4/1976 | Le Moal et al. |
| 4,314,363 A | 2/1982 | Thigpen et al. |
| 4,404,664 A | 9/1983 | Zachariadis |
| 4,566,083 A | 1/1986 | Thigpen |
| 4,745,583 A | 5/1988 | Motal |
| 4,870,626 A | 9/1989 | Tveit |
| 5,166,905 A | 11/1992 | Currie |
| 6,028,817 A | 2/2000 | Ambs |
| 6,285,956 B1 | 9/2001 | Bennett et al. |

(Continued)

FOREIGN PATENT DOCUMENTS

| | | |
|---|---|---|
| EP | 0154968 | 9/1985 |
| EP | 884607 | 12/1998 |

(Continued)

*Primary Examiner* — Ian J Lobo
(74) *Attorney, Agent, or Firm* — Norton Rose Fulbright US LLP

(57) ABSTRACT

The invention notably relates to a method for controlling depth of a seismic cable having ballasts spaced apart along its length and providing a neutral buoyancy to the seismic cable, the seismic cable being adapted for midwater data acquisition, each end of the seismic cable being connected to a respective surface autonomous vessel exerting tension on the cable through a respective lead-in cable having a negative buoyancy, the method comprising, with respect to a target depth, varying the deployed length of each lead-in cable and/or the tension exerted on the cable by each respective surface autonomous vessel.

This provides an improved solution for seismic prospecting in aquatic mediums.

19 Claims, 7 Drawing Sheets

(56) References Cited

U.S. PATENT DOCUMENTS

| | | |
|---|---|---|
| 6,456,565 B1 | 9/2002 | Grall et al. |
| 6,590,831 B1 | 7/2003 | Bennett et al. |
| 6,681,710 B2 | 1/2004 | Semb |
| 7,047,898 B2 * | 5/2006 | Petersen ............... G01V 1/3826 114/244 |
| 7,112,111 B1 | 9/2006 | King |
| 7,239,577 B2 | 7/2007 | Tenghamn et al. |
| 7,411,863 B2 | 8/2008 | Toennessen |
| 7,933,163 B2 | 4/2011 | Fossum et al. |
| 10,183,729 B2 * | 1/2019 | Haumonte ............... B63B 21/66 |
| 2005/0128874 A1 | 6/2005 | Herkenhoff et al. |
| 2011/0176383 A1 | 7/2011 | Jewell |
| 2011/0283797 A1 | 11/2011 | Manin |
| 2012/0224453 A1 | 9/2012 | Wu |
| 2012/0287751 A1 * | 11/2012 | Elvestad ................ B63B 21/66 367/16 |
| 2013/0064605 A1 * | 3/2013 | Johnson ................... B66D 1/60 405/66 |
| 2014/0204708 A1 | 7/2014 | Muijzert et al. |
| 2015/0016218 A1 | 1/2015 | Welker et al. |

FOREIGN PATENT DOCUMENTS

| | | |
|---|---|---|
| EP | 1047958 A1 | 11/2000 |
| FR | 2795527 A1 | 12/2000 |
| FR | 2870509 | 11/2005 |
| FR | 2940838 A1 | 7/2010 |
| FR | 2945356 A1 | 11/2010 |
| FR | 2961317 A1 | 12/2011 |
| FR | 2990028 A1 | 11/2013 |
| GB | 2414804 A | 12/2005 |
| GB | 2435931 A | 9/2007 |
| WO | 99/01338 | 1/1999 |
| WO | 2000/067046 A1 | 11/2000 |
| WO | 01/79890 A1 | 10/2001 |
| WO | 02/073238 A2 | 9/2002 |
| WO | 2007/070499 A2 | 6/2007 |
| WO | 2010/076646 A1 | 7/2010 |
| WO | 2011/154545 | 12/2011 |

* cited by examiner

CONTROLLING THE DEPTH OF A SEISMIC CABLE

FIELD OF THE INVENTION

The present invention relates to the field of seismic prospecting in aquatic mediums (sea or lake).

BACKGROUND

Seismic prospecting in aquatic mediums is conventionally performed by placing a set of parallel submerged seismic cables carrying a plurality of sensors (hydrophones or hydrophone/geophone combinations) spaced apart along the cable, the set of cables being towed by a seismic vessel. A source capable of creating an acoustic wave in the medium, generally in the form of an array of air guns, is towed by the seismic vessel at a distance from the seismic cables. The wave thus formed propagates to the water bottom, then further to the underlying subsoil, which gives rise to reflections at the interfaces between the geological layers forming the subsoil, which are collected by said submerged sensors. All of the information is then processed to produce a three-dimensional (3D) image of the different geological layers of the subsoil, generally used to determine the presence of hydrocarbon reservoirs.

Document FR2940838A1 discloses a seismic prospecting technique in which a set of parallel submerged seismic cables of neutral buoyancy are positioned midwater, and each cable is connected through lead-in cables to respective surface autonomous recording vessels (hereinafter "ARVs"), sometimes called "drones", at each of its two ends and subject to a tension exerted at its ends by the ARVs, so that the cables can be kept stationary or quasi-stationary during the acquisition of seismic signals. Various aspects related to this technique have been disclosed in FR2945356A1, FR2961317A1 and FR2990028A1.

The technique disclosed in document FR2940838A1 provides, in addition to other advantages presented in this document, great flexibility in the positioning of the seismic cables as compared with the conventional method in which the entire set of cables is towed by a seismic vessel; it enables in particular the cables to be positioned at a water depth much greater than the depth in the range of 5 to 15 meters which is a constraint of the aforementioned conventional method.

The object of the invention is a method for accurately controlling the depth of the cables within the range of depth levels, said range being made possible with the technique disclosed in document FR2940838A1.

SUMMARY OF THE INVENTION

It is therefore provided a method for controlling depth of a seismic cable having ballasts spaced apart along its length and providing a neutral buoyancy to the seismic cable, the seismic cable being adapted for midwater data acquisition, each end of the seismic cable being connected to a respective surface autonomous vessel exerting tension on the cable through a respective lead-in cable having a negative buoyancy, the method comprising, with respect to a target depth, varying the deployed length of each lead-in cable and/or the tension exerted on the cable by each respective surface autonomous vessel.

It is further provided a computer program comprising instructions for performing the method. The computer program may be recordable (and indeed recorded) on a data storage medium.

It is further provided an autonomous vessel adapted to be linked to a seismic cable and to control depth of the seismic cable according to the method.

It is further provided a system comprising two such vessels and one seismic cable.

It is further provided a fleet comprising one or more such systems and a distant master vessel in communication with the one or more systems and configured to send a respective target depth to the one or more systems.

It is further provided a system for controlling depth of a seismic cable having ballasts spaced apart along its length and providing a neutral buoyancy to the seismic cable, the seismic cable being adapted for midwater data acquisition, each end of the seismic cable being connected to a respective surface autonomous vessel exerting tension on the cable through a respective lead-in cable having a negative buoyancy, the system comprising a winch arranged on each vessel for connecting the respective lead-in cable to the vessel, said winch being operable to vary the length of the respective lead-in cable between the winch and the respective end of the seismic cable.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
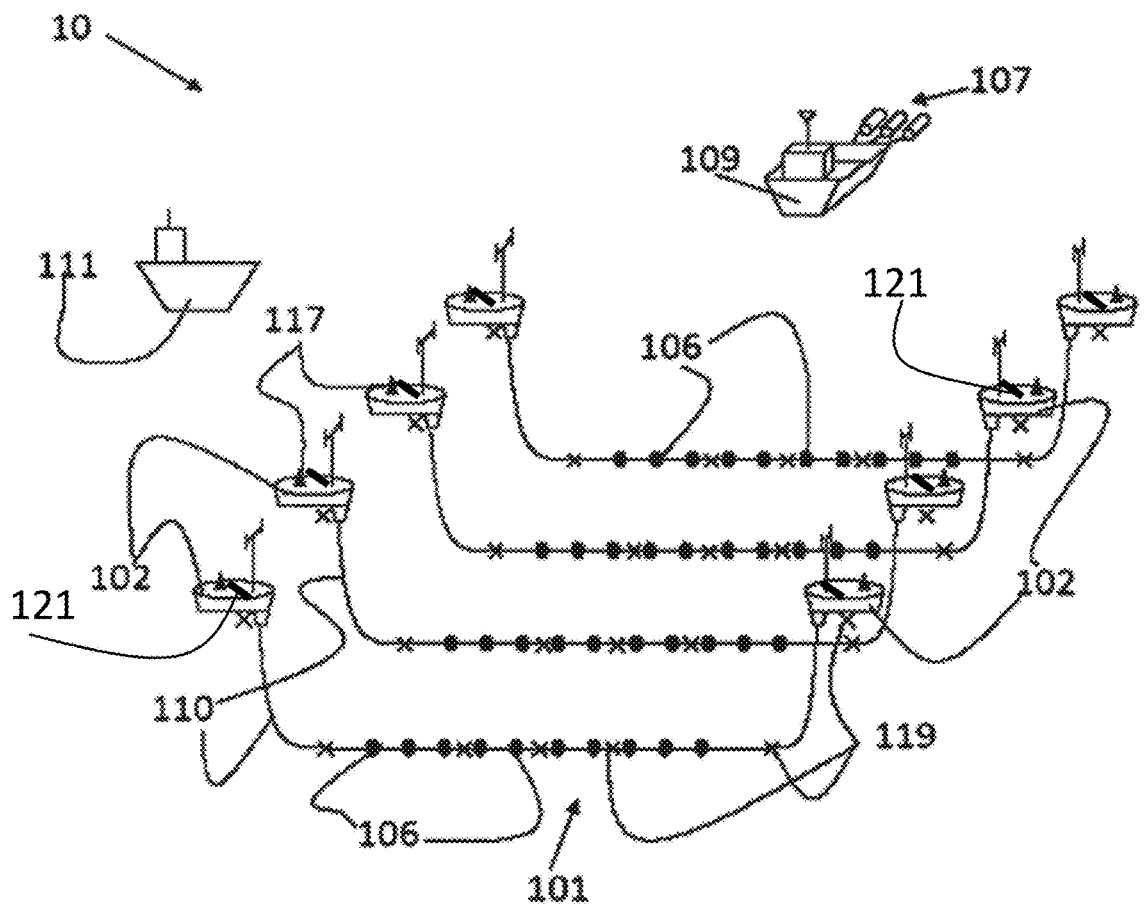
FIG. 1 shows a perspective view of a seismic acquisition system.

The method for controlling depth of a seismic cable can be integrated to a global process for seismic prospection with a seismic acquisition system that comprises a set of (at least one or two, or strictly more than three) seismic cables each configured for data acquisition.

Throughout the process, the system is deployed in an aquatic medium (i.e. sea or lake), and for data acquisition, one or more seismic sources, which can be impulsive sources (for example in the form of an array of air guns or marine vibrators, towed by a respective vehicle or boat) periodically or continuously creates a wave in the aquatic medium, whose reflection(s) at interfaces between geological layers underneath the sea bottom are collected by the seismic sensors carried by the cables of the system (e.g. as described in FR2990028A1). The data thereby acquired can then be processed to produce a 3D image of the reservoir. Throughout the process, the cables of the contemplated set are kept midwater suitably at a depth superior to 5 meters and which can reach 300 meters or more. The depth is determined so as to meet the set of specific data quality requirements pertaining to the zone to be prospected. A typical value can be on the order of 100 meters or between 100 and 200 meters. Each cable includes seismic sensors (suitably hydrophone and possibly geophone) spaced apart along the cable. Throughout the process, the cables are arranged laterally aligned (one with respect to another), so as to form a 2D horizontal array of sensors and thereby provide adequate coverage of the zone to be prospected. The cables may be maintained parallel one to another (e.g. as much as possible, with respect to other constraints).

Furthermore, any combination of at least one of the cables of the system (for example, all the cables of the system) may also respect any or a combination of the following requirements.

The system enables the cables to be maintained during acquisition in a stationary or pseudo-stationary manner) either relative to the aquatic medium, or relative to the bottom of the water (i.e. thus relative to the terrestrial referential). This can be performed according to FR2940838A1, which is incorporated herein by reference (notably regarding such positioning of the cable). While maintaining a stationary or pseudo-stationary position, the movement of the cable may also be restricted by a maximum track curvature value in the water, as described in FR2961317A1, which is incorporated herein by reference (notably regarding the definition and/or value of said maximum track curvature value in the water and/or how to respect such constraint). This allows relatively low mechanical and energy constraints.

In order to achieve such positioning, both end(s) of the cable are connected to respective surface vessels (for example aforementioned ARVs) through respective lead-in cables. The ARVs are adapted to control position of the cable by exerting tension at its ends through the lead-in cables. In such a context, the two ARVs allow a prompt compensation of the current anytime, even in case of quickly changing currents. Furthermore, owing to the speeds at stake (for usual sea currents), the ARVs can be relatively small in terms of size and/or mechanical capacities (relative to conventional seismic vessels). The ARVs may for example have a length inferior to 20 meters or 12 meters (e.g. about 8 meters), a width inferior to 15 meters or 10 meters (e.g. about 6 meters), and a height—excluding a mast—inferior to 12 meters or 8 meters (e.g. about 4.5 meters) and each ARV is mechanically adapted for pulling the cable at any speed up to a predetermined maximum speed—relative to the water which can be equal to 5 knots (about 9.26 km/h). As stated above, the system enables the seismic cables to be kept stationary or quasi-stationary, which implies a speed in the range of 0 to 2 knots relative to the water medium, but it also enables the cables to be moved at greater speeds, as suitable for displacements between acquisition stations or for transit to a zone to be prospected or to meet specific operational requirements. The seismic cables may have a length superior to 1 km, or superior to 4 km, for example about 8 km. The seismic cables have a weight (in the air) of typically about 2700 kg/km and are neutrally buoyant in water, as mentioned above. The lead-in cables have a weight (in the air) of typically about 3300 kg/km and have a negative buoyancy in water.

Variable buoyancy ballasts are installed at intervals along the seismic cable of e.g. 250 meters. The ballasts can be as described in FR2945356A1, which is incorporated herein by reference (notably regarding how such ballasts work). The ballasts may be configured to ensure that at any time the buoyancy error of the cable (i.e. the ratio between the optimal weight of the cable to reach a zero buoyancy and the real weight of the cable) is substantially always inferior to e.g. 1%.

FIG. 1 shows a perspective view of an example 10 of such a marine seismic acquisition system. System 10 comprises a set 101 of parallel seismic cables 110, each in accordance with the above explanations, thereby forming an array of floating cables to acquire seismic signals (receivers), and a seismic source 107 towed by a source boat 109 (i.e. shooting vessel to generate seismic source). In the illustrated example, each cable 110 is connected at its ends to independent ARVs 102 suitable for moving the cable 110 and keeping it under tension, the cable being connected to the ARV via a winch 121, and which incorporate such a control unit. The ARVs 102 thereby position receiving cables and control the array geometry. The control unit is a system comprising a processor coupled to a random-access memory, and implementing a program comprising instructions for controlling the speed of the cable 110. The set 101 of cables 110 is provided with a plurality of sensors/receivers 106 (suitably hydrophone/geophone combinations) capable of collecting said reflected waves. Such a cable 110 may be called a "seismic cable". The cables 110 evolve in an acquisition station adapted to prospect part of the aforementioned area of the subsoil. The seismic source 107 is triggered. The receivers 106 are used to pick up the reflected waves. It is then possible to operate the ARVs 102 to move the cables 110 to another measuring station adapted to prospect another part of the aforementioned area, and to move the seismic source 107 as well, and so forth. The cables 110 have a neutral buoyancy and are submerged at a depth (i.e., the distance relative to the surface of the water, which surface is not represented on the figure) as defined hereinabove. Each of the cables 110 is suitably provided with ballast-forming elements 119 designed to keep the cable 110 at the desired weight in the water so as to be neutrally buoyant. The ballasts 119 allow the cables 110 to be kept at substantially constant depth and to vary it in a controlled manner. Each of the cables 110 is also provided at both ends thereof with surface ARVs 102 in the example, capable of moving the cables 110 and keeping each cable 110 under tension. Master vessel 111 coordinates overall operations and communicate with the ARVS 102 via antenna 117 provided on an ARV 102.

The positioning of the cables, the source, and/or the control of the ballasts and/or the source may be performed automatically or semi-automatically (e.g. involving to some extent human specialists on-land or on-board e.g. the vehicle towing the source or any nearby vessel via computer program(s) embedded in one or more control units that may receive signals from and/or send signals to any element of the system to which such control unit is coupled (e.g. via radio link for surface communications and physical—e.g. electrical—cable connection for underwater communications). Such control unit(s) may be embedded within any vehicle (e.g. the vehicle towing the source or any nearby vehicle) and/or the ARVs, and/or any other element of any cable for which control is needed.

Figure 2:
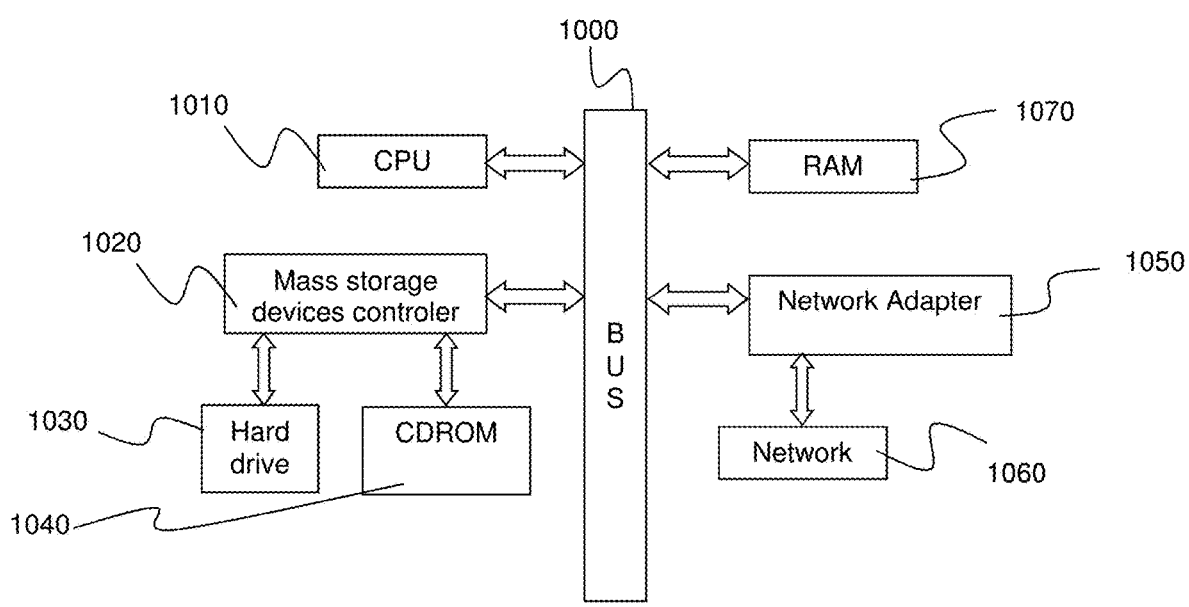
FIG. 2 shows a schematic representation of an example control unit.

FIG. 2 shows an example of such a control unit, embodied as a standard computing system. The control unit of the example comprises a central processing unit (CPU) 1010 connected to an internal communication BUS 1000, a random access memory (RAM) 1070 also connected to the BUS. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A communication adapter 1050 manages accesses to a communication system 1060 (e.g. radio communication system).

The computer program may comprise instructions executable by a computer, the instructions comprising means for causing the source, the seismic cables and/or any other components of the seismic prospecting system to perform any of the methods described herein. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the control unit results in any case in instructions for performing the method steps.

Figure 3:
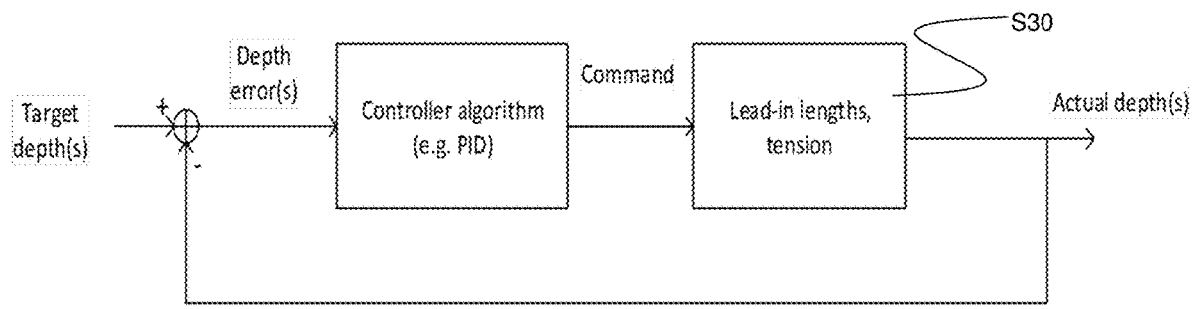
FIG. 3 shows a flowchart of an example of the method.

FIG. 3 shows an example of a method, that can be implemented in this context, for controlling the depth of a seismic cable having ballasts spaced apart along its length and providing a neutral buoyancy to the seismic cable, the seismic cable being adapted for midwater data acquisition, each end of the seismic cable being connected to a respective surface autonomous vessel (ARVs as described above being considered in the following discussion). The method comprises varying S30 (i.e; changing or modifying, e.g. increasing and/or decreasing) the deployed length of each lead-in cable with respect to a target depth and/or the tension exerted on the cable by each respective surface autonomous vessel. In other words, to reach "at best" a target depth (i.e. minimize the deviation of the seismic cable from the target depth, e.g. provided any—e.g. mechanical and/or energy—constraints), the method of the example comprises acting on different parameters, including varying at a time the deployed length of any or both the lead-in cables, or varying at a time the tension exerted by any or both the ARVs to the cable (via the lead-in cables), or any combinations thereof. Thus, in some example situations, the method may comprise phases where both the lead-in cable lengths are varied at a same time (not necessarily similarly), and/or phases where both the ARVs are exerting a tension on the cable—e.g. both tensions possibly being varied at a time (again not necessarily similarly), and/or phases where the tension at both ends and the deployed length at both ends are all varied at the same time. This can be implemented via (e.g. continuous) execution of a control loop as shown on FIG. 3. The method may be used for a dynamic positioning of the seismic cable at a target depth, e.g. while the seismic cable is acquiring measurements (as described earlier). The improved control of depth provided by the method thereby improves the data acquisition.

In the method, each end of the seismic cable is connected to a respective surface ARV exerting tension on the cable through (i.e. by/via/with) a respective lead-in cable. The lead-in cables are merely cables mechanically strong enough and adapted to link the seismic cable respectively to the two ARVs, such that the two ARVs and the seismic cable can form a unitary system. Now, the lead-in cables have a negative buoyancy (such that they are heavy and sink in the water) and function as depressors for the seismic cable. The surface ARVs are adapted to float on the surface. The interface water/air is thus useful to the method because the weight of the lead-in cable is supported by the floatation of the ARV (vertical component of the force). The lead-in cables may not embed any ballast (or only at their extremity where they are connected to the seismic cable). Thus, the lead-in cables are used as depressors to make the ends of the seismic cable reach any depth and thereby control their depth, in a relatively quick, efficient, safe and simple manner (compared for example to a ballast-only solution and/or a moving weight solution). Moreover, the lead-in cables perform this function at both ends of the seismic cable. Thus, even in a stationary use the depth is relatively accurate (with respect to the target depth) at both ends. Also, through the lead-in cables, the two ARVs exert tension on the seismic cable at any time (the lead-in cables having an adapted rigidity for that purpose). This way, the method may ensure a control of depth not only for the ends of the seismic cable but also along the cable. In operation, the tension can cooperate with the length varying, e.g. so as to minimize (i.e. this expression encompassing any minimization process, including merely respecting an error threshold constraint) a global depth error along the seismic cable (i.e. a depth error calculated along the seismic cable, such as later-mentioned sum of squares error, as opposed to a depth error calculated merely at the ends of the seismic cable). The tension can thereby be a function of the target depth, the length of the cable, and the buoyancy error along the cable. For example, the tension in the seismic cable is always superior to 100 kgf, e.g. around 300 kgf. To reach such a value, the tail vessel exerts a tension opposite to the direction of the head vessel.

The method is for controlling depth, which means that the method relates to achieving for the seismic cable a target depth. The target depth can be any depth value predetermined for the seismic acquisition to be performed and between 0 and 300 meters (e.g. any value superior to 5 meters or 20 meters and/or inferior to 300 meters). The target depth value can be constant throughout the method or vary with time. The target depth value can be a scalar value (e.g. the same value is targeted for the whole seismic cable) or a spatially varying value, such as a vector of values associated to different positions of the seismic cable (e.g. if—at least sometimes—different target values are contemplated for different parts/points of the seismic cable, e.g. when the cable or a part of the cable is slanted). Indeed, the seismic cable does not necessarily have a single depth definition. The depth can be seen as a depth vector along the seismic cable, or as an average of such vector, or yet as a pair of depth values provided for the extremities of the seismic cable. The target depth value is any desired depth value provided for the seismic cable, for example to achieve a desired data acquisition and quality of the data, and it may be provided in any way. The target value may be provided by a central control unit communicating with the different seismic cables of the whole system (such as earlier-mentioned master vessel), and the target value provided for each seismic cable may be different from the others, such that the method of FIG. 3 may be implemented independently for the different seismic cables of the set of cables.

The method is implemented in the water, e.g. where sea currents can vary through time. The dimensions at stake can also influence stability of the system. Also, any target depth is particularly difficult to achieve in the stationary or pseudo-stationary context. A technical difficulty to control depth is indeed linked to the fact that the system may have to be stationary or pseudo-stationary in the 2D horizontal plane and static in the vertical plane. As explained earlier, the seismic cable includes remotely controlled ballasts along the cable. The primary function of such ballasts is to control the depth of the seismic cable (referred in the following to as "MSC", as in Midwater Stationary Cable) when the lead-in cable heads are at the correct depth. In effect, the ballasts may first perform a static correction of the initially globally non-neutral buoyancy of the seismic cable (e.g. the seismic cable being designed to be of neutral buoyancy in fresh water, but then provided with weights for the salt water use where the buoyancy is not perfectly neutral as such in the general case). But the ballast may also perform a dynamic correction of local variations of buoyancy of the seismic cable. In specific, the ballasts compensate the variations in the water density (e.g. due to temperature salinity and/or currents variations) so as to maintain the seismic cable as neutrally buoyant as possible. However, the ballasts are not mechanically designed to compensate the weight of the lead-in cables, which the method performs in effect by varying the deployed length of these lead-in cables (thereby controlling depth of the ends of the seismic cable, the depth along the cable being controlled by the ballasts and the tension). Also, in some situations the depth may vary due to the environment and the ballasts may not be prompt/responsive enough to correct it, so as to achieve an accurate controlled depth, typically within +/−1 meter with respect to the target depth. In such a situation, the method may also comprise dynamically (e.g. continuously, e.g. real-time) varying the deployed length of each lead-in cable with respect to a target depth, and/or adapting the tension accordingly to minimize the global error.

The method of FIG. 3 thus proposes for example to continuously vary S30 (as the seismic cable is deployed midwater, and/or seismic data acquisition is performed) the deployed length of each lead-in cable with respect to the target depth and/or the tension exerted on the cable (e.g. possibly at a varying speed). The varying S30 may be performed dynamically—that is, "continually" or "continuously"—for the lead-in length and/or the tension. By "dynamically" or "continuously", it is meant that throughout a whole positioning, e.g. throughout a whole acquisition sequence at a given (e.g. stationary or pseudo-stationary) measurement station, the variation of deployed length and/or the tension can be performed (and observed) more than a single time (e.g. several or many times). For that, the varying S30 can be non-stop, or alternatively the varying S30 can be performed at consecutive steps (which steps may be regular or irregular, of the order of several seconds, several minutes, several hours, and/or yet several days). Considerations related to this are however details of implementation. For example, the actual depth of the seismic cable may be checked several times (e.g. via dedicated sensors, as explained later) and it may actually be corrected by varying the deployed length of the lead-in cable connected to the head ARV and/or the lead-in cable connected to the tail ARV and/or the exerted tension. Thus, the lead-in cables have a variable length (for example, varying the deployed length of each lead-in cable may be performed by a winch arranged on each of the ARVs), and this allows to control a potential pulling upward or letting sink downward each end of the seismic cable by paying out or reeling in lead-in cable length. This provides a way to control depth promptly/responsively in many circumstances, including when the speed of the seismic cable relative to the water is very low. The lead-in cables have a length greater than the maximum depth at which the cable is to be positioned, e.g. 400 meters if the maximum depth is 300 meters.

Such (e.g. continuous) variation S30 of the deployed (i.e. paid out) lead-in cable length(s) and/or tension can be performed in cooperation with a process of controlling the ballasts (e.g. varying the ballast buoyancy). However, throughout an acquisition sequence, notably for a given (time-constant) target depth value, each ballast buoyancy may be kept constant, such that slight modifications of the depth (e.g. due to changes of currents and/or instability due to dimensions at stake) are prevented and/or corrected (i.e. compensated) by the variation S30.

Also, the variation of the deployed lead-in cable length is performed in cooperation with the process of exerting tension to the seismic cable by the ARVs, which tension may also be varied as a result of S30. Thus, tension requirements and/or constraints may be taken into account (in any way) when performing S30. For example, in the case each ARV is equipped with a winch reeling in or paying out its respective lead-in cable, in some situation (e.g. no or low current) both winches may always exert a minimal force (that tends to reel-in the lead-in cable), such minimal force depending on the geometrical and/or mechanical characteristics of the seismic cable and/or on the force exerted by the other winch, so that a tension higher than a predetermined minimum value is always exerted on the seismic cable. This can also be achieved by locking the winches, in which case the winches merely transmit to the seismic cable through the lead-in cables the tensions exerted by the ARVs. In a way, it can be said that the winches can exert a force onto the lead-in cable, thereby cooperating to exert a tension in the seismic cable, even at moments where the length of the lead-in cable is not varied. In other words, the same winch+lead-in cable system is synergistically used to both exert a tension in the seismic cable and control its depth. Inversely and in a similar way, the force exerted by each winch may be subject to a maximal value. The varying S30 may be constrained by such predetermined minimal and/or maximal tension to be exerted in the seismic cable, and the winches may be controlled accordingly, and in an example depending on the value of the sea current (and the tension force exerted by the mere sea current).

The varying S30 may be performed at different speeds. In other words, the speed may be varied. Notably, if the varying of the paid out lead-in length is performed via a winch, when the method intends to pay out length or reel in length, the rotating speed of the winch usually increases and/or decreases progressively throughout the process. This prevents brutal changes and mechanical fatigue. This also applies to the ARVs when they use speed/traction to exert tension.

It is noted that both lead-in cables have a variable paid out length, such that even in case there is a current (e.g. even small) and the seismic cable is kept stationary or pseudo-stationary with respect to the seabed, not only the length of the head lead-in cable can be varied but also the length of the tail lead-in cable can be varied. Thus, if the current varies, the system can promptly/responsively adapt and the depth control is more responsively accurate on the whole length of the seismic cable. This is also true for the ARVs exerting tension.

Actually, varying the deployed length of each lead-in cable and/or the tension exerted on the cable by each respective ARV may even be performed independently for each lead-in cable (resp. at each end). In other words, for example the process that controls one lead-in cable deployed (i.e. paid out) length may be independent (from a data processing point of view) from the process that controls the other lead-in cable deployed length. This notably means that the deployed lengths can be different at a time (and they are generally different), such that at some points the deployed lengths may be different and/or at some times the paid-out length or pulled-in length (relative to the current length) and/or deploying speed may be different for the two lead-in cables (more or less length is paid-out for one lead-in than for the other, with even in some situations no variation for one lead-in and a non-nil variation for the other). This allows a particularly accurate control of depth, notably in the stationary and pseudo-stationary context.

Varying the deployed length of each lead-in cable and/or the tension exerted on the cable by each respective ARV may generally be performed in any way. In an automated example, such varying is performed via a control loop that takes as input data notably a measurement of depth of the seismic cable. In other words, instead of relying on analytics to calculate the theoretical deployed length of lead-in cables for the target depth, the method may rely on a measurement of depth (i.e. any measurement related to depth of the seismic cable, and thus to the target depth) and iteratively (e.g. dynamically or essentially dynamically) vary the deployed length of both lead-in cables and/or the tension exerted on the cable by each respective ARV to perform a depth correction. There can actually be one such algorithm running per respective ARV, independently from each other. In other words, there can be one different computer program or computer program instance per ARV, and for example each ARV may embed its own computer program. These make the depth control accurate, as this allows absorbing in a simple and robust way changes in the environment (e.g. changes in sea currents and/or sea density). This may also be the case for the tension exerted on the cable, which may be determined via a similar control loop. Such control loops may be interlaced.

The control loop may receive signals (from sensors) and/or send signals (to command the varying S30) uninterruptedly or periodically (e.g. the command pattern being possibly the same or different for respective sort(s) of received signal and/or sent signal). The control loop may implement filters on the received data if a reception is uninterrupted (e.g. so as to reduce noise). If a period is contemplated, the period may be constant or varying and it can be between 10 seconds and 20 minutes, typically around 1 minute (e.g. between 45 seconds and 75 seconds). The period can notably be distinct (beyond 10%) from the frequency of surrounding waves (e.g. which can be measured in any way). This reduces fatigue of the system (notably of the winches which would otherwise be used too much).

Typically, the measurement of depth of the seismic cable can be a set of depth values determined via sensors arranged along the seismic cable. Such sensors are for example the water pressure sensors (which indirectly lead to depth measures) respectively linked to the ballasts, as disclosed in the above-mentioned document FR2945356A1. Rather than only one sensor, at least two sensors (e.g. one at each extremity/end of the seismic cable) can thus be contemplated, or even more, e.g. all along the seismic cable, e.g. at a regular interval. In an example, pressure sensors (not shown on the drawings) are provided for each cable section between two consecutive ballasts, suitably midway of each cable section. This provides a precise and comprehensive value of depth. Remarkably it provides means to interpolate the catenary shape of a section between two ballasts, the catenary shape being due to the imperfect neutrally buoyancy cable balancing. In an example, the target depth is a single value to be achieved by all the depth sensors (that is, it is intended that the cable be as horizontal as possible), and the control loop performs the varying S30 according to a global error calculated for all the depth sensors (e.g. a least square error).

Similarly, the input data of the control loop may include measurements of the deployed length of each lead-in cable (instead of having the control loop rely on a theoretical value). This provides accurate results. In specific the control loop may control each respective winch (total angle of rotation and/or speed of rotation) so as to control the deployed length of the lead-in through time. Also, the seismic cable may comprise positioning sensors such as acoustic sensors (notably used for the stationary positioning of the seismic cable), whose outputted data may also be inputted to the control loop, e.g. to create data redundancy.

In an example, the principle of the method thus consists in having a motorized winch integrated into each ARV to deploy more or less (lead-in) cable and a control mechanism to deploy the correct length of (lead-in) cable to achieve the target depth. As mentioned earlier, given the requirements of the context of use, the target depth for the tail ARV could be different than the target depth of the head ARV. Hence the system is in an example extremely flexible and tunable.

Figure 4:
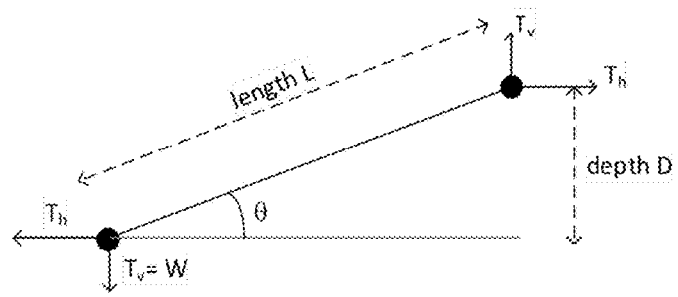
FIGS. 4-14 illustrate the method.

The physical principle can be understood easily by simplifying the problem. Let D be the depth of the (seismic) cable head, L the length of lead-in cable, and Th the horizontal tension in the seismic cable at the lead-in cable head, as represented on FIG. 4. By assuming the lead-in cable is straight in the water, we can write $\sin\theta = D/L$. By writing the equilibrium at the cable head point we obtain: $\tan\theta = Tv/Th$, where Tv is the vertical force exerted downwards at the cable head. Tv is actually the weight of the cable head in the water denoted W. So the lead-in length L to be at depth D is obtained by:

$$L = D/\sin(\arctan(Tv/Th)) = D*(Th/W)/\sqrt{(1+(Th/W)^2)}$$

If the weight of the cable head is negligible compared to the tension, the length is simply approximated by: $L = D*Th/W$. So obviously the length can be set to have the right depth.

It is important to note that the lead-in length depends on the inline tension in the cable (Th). In our case the inline tension at the head ARV depends on the velocity with respect to the water because of hydrodynamic drag force along the cable. This means in the case the MSC is stationary or pseudo-stationary that the inline tension depends among others on the sea current. Indeed the hydrodynamic force F along the MSC at the speed v (relative to the water) can be computed as:

$$F = \tfrac{1}{2} \cdot \rho \cdot v^2 \cdot (\varepsilon_f L_{MCS} \pi \cdot D_{MSC} + c_d \cdot S_{tp})$$

Where:
The first term in the parenthesis corresponds to the inline friction force:
  $\varepsilon_f$ is the cable friction coefficient
  $L_{MSC}$ is the length of the MSC
  $D_{MSC}$ is the cable diameter of the MSC
The second term in the parenthesis corresponds to the transverse pressure force:
  $c_d$ is the transverse pressure drag coefficient
  $S_{tp}$ is the projected area creating transverse pressure force
  $\rho$ is the water density
  v is the water speed of the MSC It is noteworthy to add that for a same target depth, the lead-in cable length for the head ARV is different from the lead-in cable length at the tail ARV in the presence of current (or speed relative to water) because the inline tension is different at the tail and at the head. The cable length at the tail ARV does not depend on the current in this simplified theoretical framework.

Figure 5:
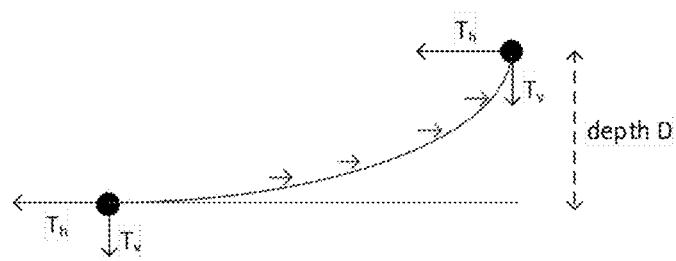

In reality the problem is a bit more complex and we have to consider two additional points:
The hydrodynamic force on the lead-in cable itself
The weight of the lead-in which is heavy in the water
So the lead-in cable has a catenary shape, as represented on FIG. 5, which shows a depth profile of a heavy lead-in cable and sea current. In case hydrodynamic forces on the lead-in cable are not considered (for instance in case of no current), the shape of the lead-in cable is obtained by the simple catenary equation:

$$y = (\cos h(\mu \cdot x) - 1)/\mu$$

where:
$\mu = m_L/T_h$
$m_L$ is the linear mass of the lead-in cable in the water
$T_h$ is the horizontal tension at the ARV side
cos h is the hyperbolic cosine function
y and x are the coordinates of the lead-in curve in a Cartesian plane (x, y)

In the general case where both forces on the lead-in cable and weight of the lead-in cable have to be considered, the differential equation to solve is for T:

$$\frac{dT}{ds} + G = 0$$

Where:
s is the arc length along the cable
T=T(s) is the local tension vector
G=G(s) is the local total force vector (i.e. the sum of the weight and of the external forces)

In the case where the weight of the lead-in cable can be neglected compared to the external forces on the lead-in cable, the external forces are perpendicular to the vertical direction and uniform along the cable, the equation can be analytically solved. The shape of the lead-in cable is then a parabola (suspended bridge formula):

$$y = \mu/2 \cdot x^2$$

Generally speaking in the real case the equation is more complex to solve but the physical principle is the same: the depth is adjusted by controlling the length of the lead-in cable. The deeper the target and the higher the tension, the longer the lead-in cable.

The differences with the simplistic case are:
if the lead-in is heavy in the water, paying out more cable adds some weight in the water.
the hydrodynamic force at the tail ARV varies with current and hence the length varies with current.
the horizontal component of the hydrodynamic force on the lead-in cable has a different effect at the head ARV than at the tail ARV: it lifts the head lead-in cable upwards while it pushes the tail lead-in cable downwards.
the force varies along the lead-in cable because current is not the same in surface and at depth (in intensity or/and in direction).

The latter point indicates that the depth control problem is actually a three dimensional problem since the lead-in cable curve is not necessarily contained in a vertical plane. Note that the catenary shape has the advantage that the cable shape is smoother and the angle at the cable head junction is softer (better for noise).

Figure 6:
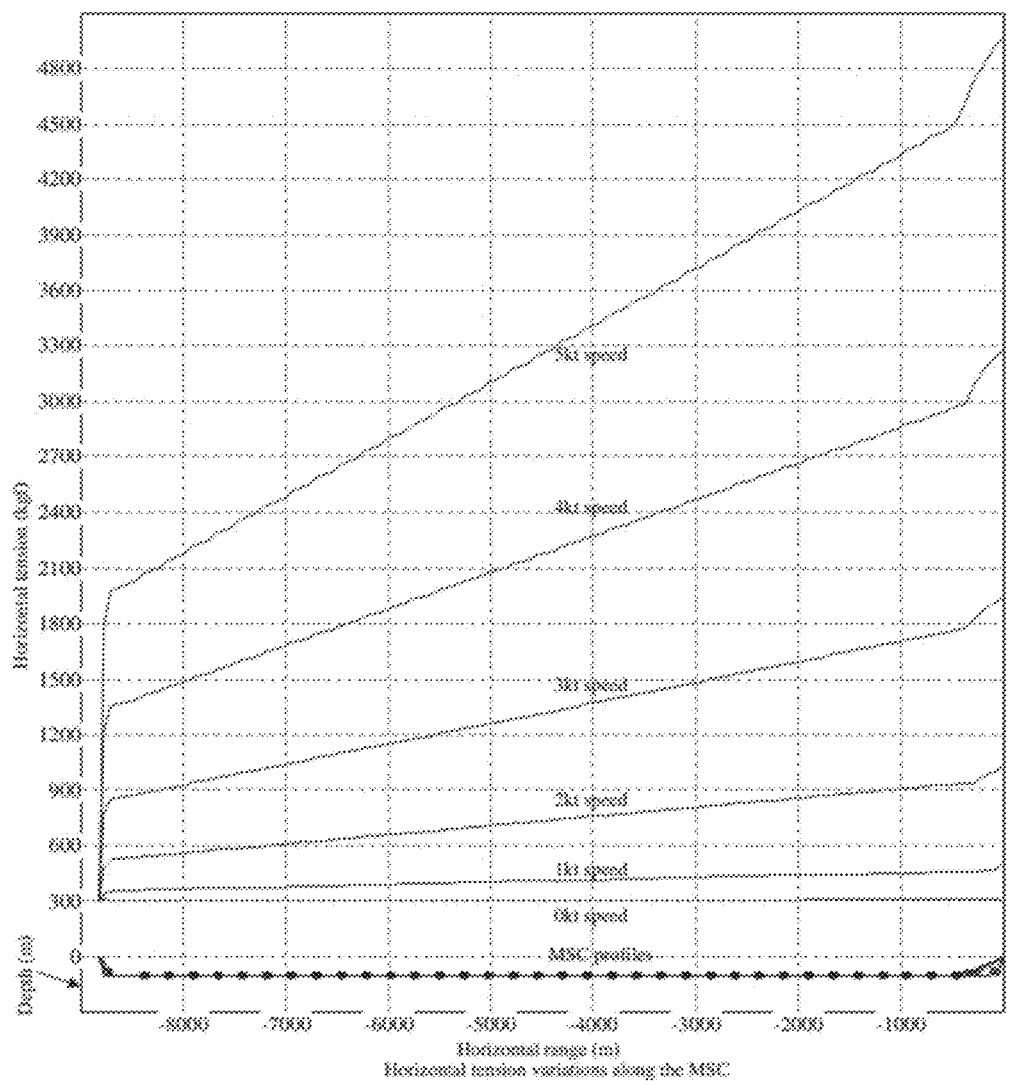

Studies have been carried out to validate these principles.
Simulations have been made to derive the shape of the MSC and the shape of the lead-in cable for various water speeds. FIG. 6 presents for example a simulation of MSC Tension and Depth Profile for Different Water Speeds.

Figure 7:
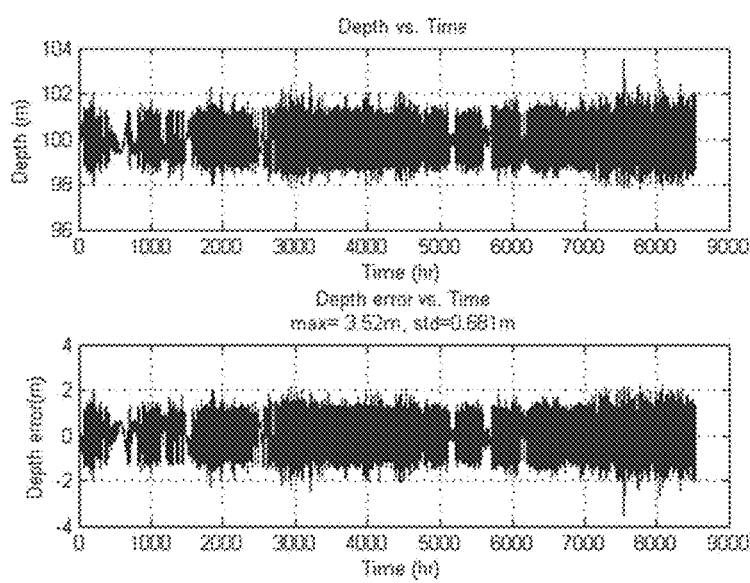
Figure 8:
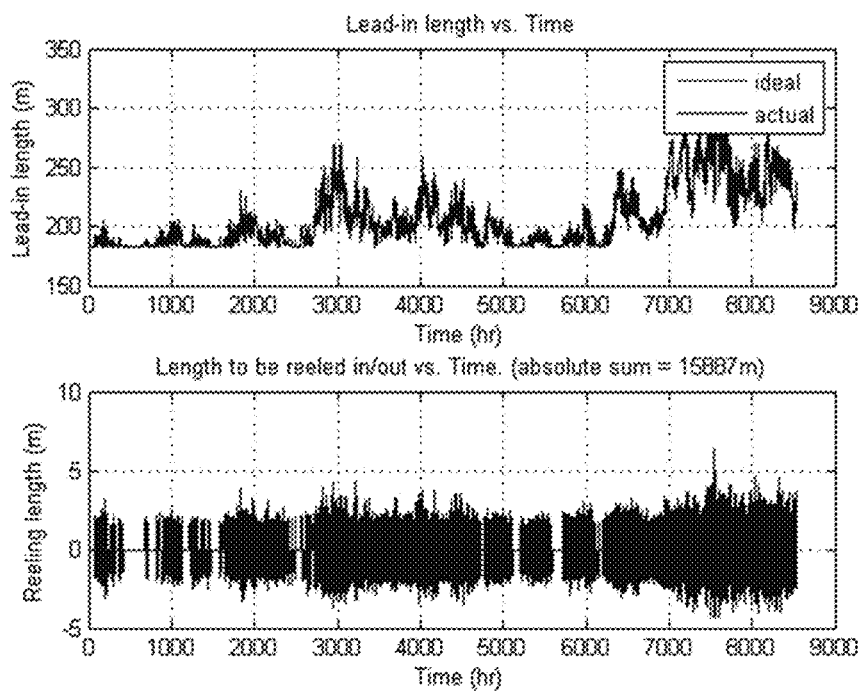
Figure 9:
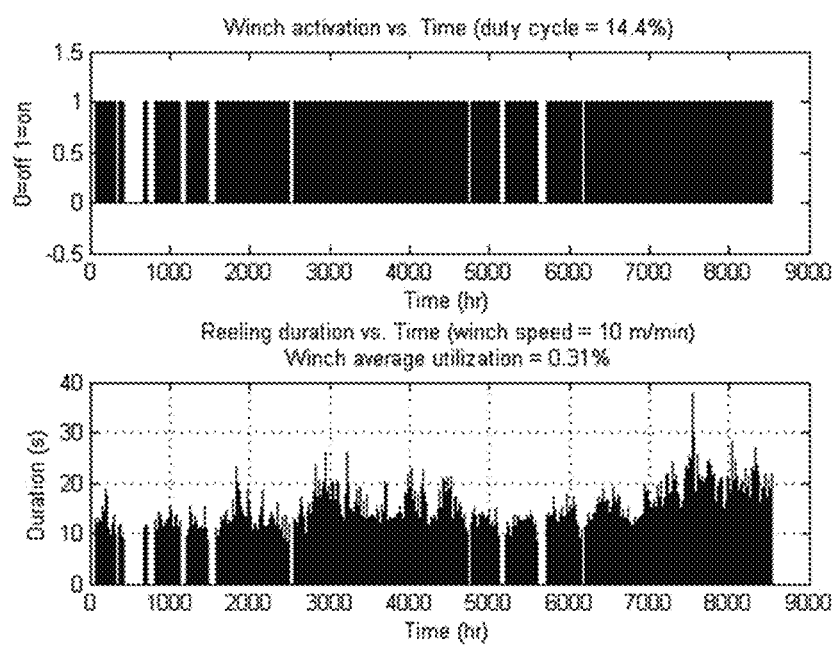

Simulations have been made to prove that the concept of reeling in or paying out the cable to adjust depth is realistically implementable given real current values across the world and winch reeling speed capability. For example FIG. 7 shows simulation results (depth and depth error) in presence of currents, FIG. 8 shows simulation results (lead-in length and reeling length) in presence of currents, and FIG. 9 shows simulation results (winch activation and reeling duration) in presence of currents.

As explained earlier, in practice a possible solution is for each winch to be controlled through an automatic command and control loop (i.e. algorithm). The algorithm receives the depth set point from a controller.

The algorithm may typically use as inputs values of (related to/provided by) the following (as mentioned earlier for some of them): depth sensors, water speed sensors, paid out length sensors, winch speed sensors, winch end switches, mechanical tension in the MSC, mechanical tension in the winch, current measurements, current forecasts, and/or sea density (T° C., salinity, pressure), being however noted that the variations of sea density may be absorbed by the ballasts without necessarily having to measure such values. Some of the inputs (such as end switches, paid out length or mechanical tension in the winch) can be used as input for a safety mechanism to stop the winch in emergency. Some other inputs (water speed, mechanical tension) can be used to tune and adapt the parameters of the algorithm (e.g. the coefficients of a PID).

Figure 10:
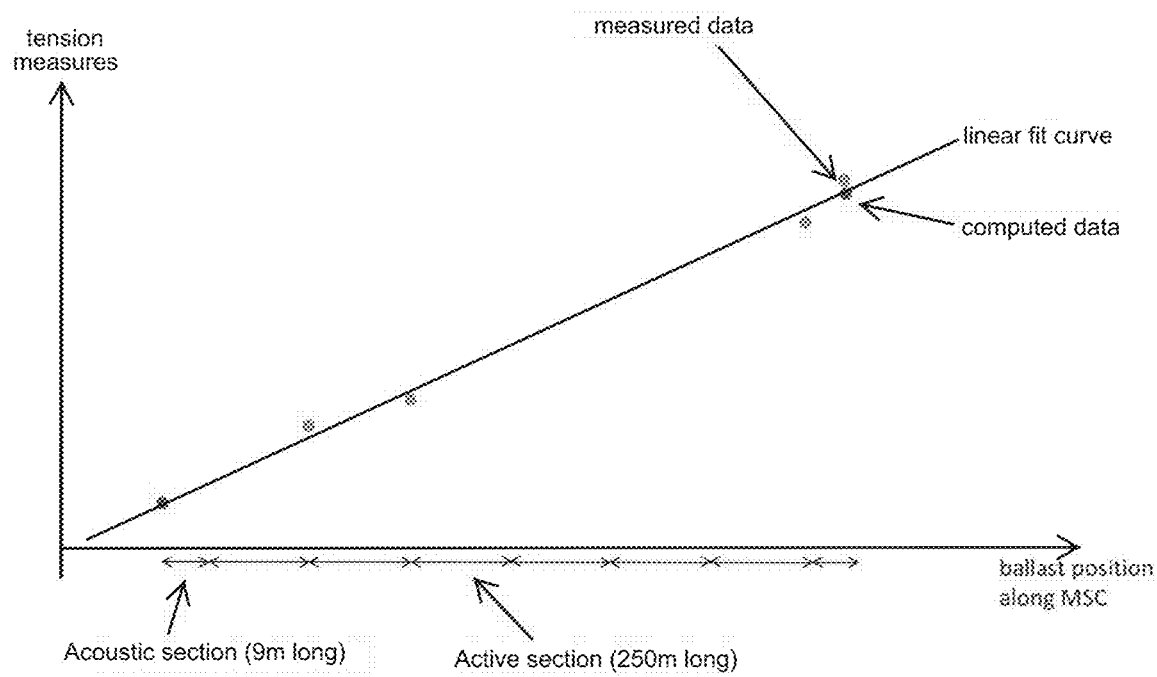

The algorithm can thus process a plurality of raw sensor data to estimate some more stable and precise inputs to be used by the algorithm. For instance:
filters or other processing means can be used to remove noisy measurements.
the tension can be derived by using a linear best fit with available tension measurements (as shown on FIG. 10 which represents linear best fit for mechanical tension estimates in the MSC).
depth feedback can be obtained from a positioning system using multiple inputs (data merging).

When the input data of the control loop further include measurements of each winch speed, state of winch end switches, and/or measurements of mechanical tension in each winch, this increases safety. When the input data of the control loop further include current measurements, current forecast, and/or values relative to sea density (such as water speed sensors, current measurements, current forecasts, sea density –T° C., salinity, pressure), this allows anticipation by the control loop and thus a faster depth control/correction. When the input data of the control loop further include measurements of mechanical tension in the seismic cable, this allows synergy between the exertion of tension to the seismic cable by the two ARVs and the depth control.

In an example, the algorithm goal is (e.g. related) to minimize the depth error along the cable:

$$E_t\left[\sum_i (td_i - ad_i)^2\right]$$

Where $E_t$ is the expectation over time, $td_i$ is the target depth at location i, and $ad_i$ is the actual depth at location i. The use of a least square error in the control loop allows a globally accurate control of depth.

In an example, the algorithm produces the following outputs to control the winch actuators: length to be paid out or paid in, winching speed, winching force to be used, and/or tension.

In the case of a non-perfectly balanced cable in the water (neutral buoyancy not perfectly attained), increasing the tension tends to flatten out the line and decrease the total depth error.

Figure 11:
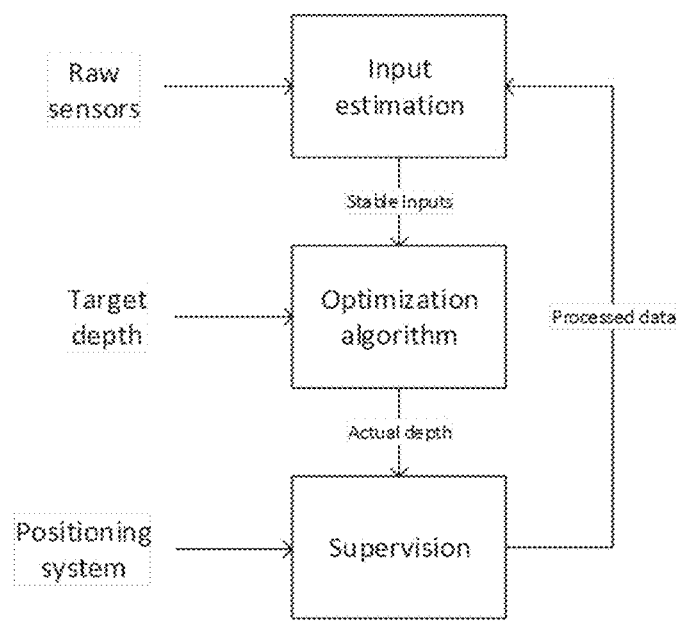

The general structure of an example of the algorithm is depicted on FIG. 11:

An input estimation block is used to generate stable inputs.

An optimization algorithm controls the winch to minimize the error between the target depth and the actual depth. The optimization can be typically of PID type and control the speed of the winch to ensure smooth transition.

A supervision block monitors the overall behavior of the system and possibly provides processed data to be used by the optimization algorithm.

Examples of geometries that can be implemented are now discussed.

Figure 12:
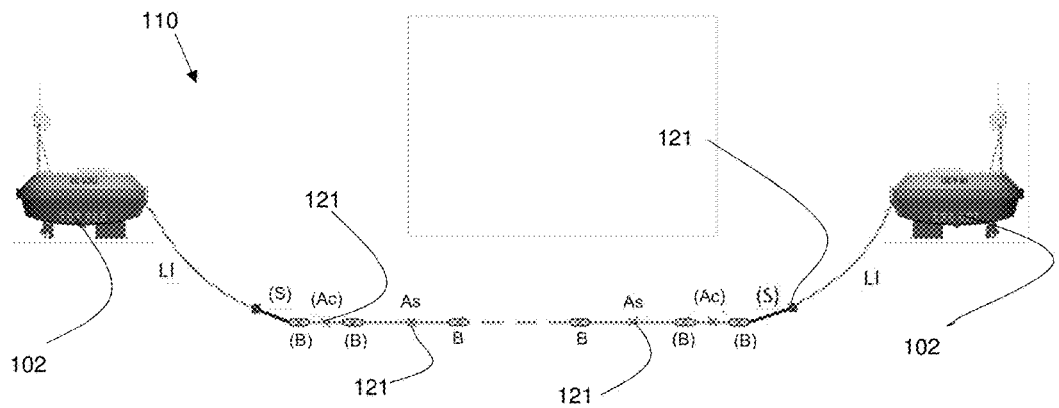

An example MSC is represented on FIG. 12. The example MSC (e.g. typically 8-kilometer long) is connected to ARVs 102 via lead-in cables LI and is composed of:

Two lead-in cables LI of 400 m (generally longer than 100 or 200 m and/or shorter than 800 or 600 m) terminated by a cable head (one at each side)

Two stretch sections S to damp shocks and vibrations coming from sea surface (one at each side)

Two acoustic sections Ac equipped with compass and acoustic units (one on each side)

One seismic cable 110 made of 250-meter long active sections including seismic receivers each comprising a hydrophone and a three-axis geophone every 25 m (generally every x meters with x fixed or varying and higher than 5 or 15 m and/or lower than 100 or 35 m).

Auxiliary equipment installed on the cable (appurtenances):

Cable ballasts B every 250 m (generally every y meters with y fixed or varying and higher than 100 or 200 m and/or lower than 500 or 300 m) between each active section As Acoustic positioning units, depth sensors 121 and compass every 250 m (generally every z meters with z fixed or varying and higher than 100 or 200 m and/or lower than 500 or 300 m) in the middle of each active section (to precisely locate sensors)

In the example, depth meters are present in the cable heads, in each ballast, and in the middle of the active sections and of the acoustic sections. Tension meters are present in the cable heads and in the ballasts. Stretch sections and acoustic sections may or may not be used—depending on the type of deployment chosen.

Examples of lead-in cable characteristics that can be implemented include:

Outside diameter: higher than 10 mm and/or lower than 50 mm (e.g. 30 mm);

Weight in air: higher than 1 kg/m and/or lower than 5 kg/m (e.g. 3 kg/m); and/or Weight in water: higher than 0.5 kg/m and/or lower than 4 kg/m (e.g. 2 kg/m).

Examples of seismic section characteristics that can be implemented include:

Outside diameter: higher than 20 mm and/or lower than 100 mm (e.g. 60 mm);

Weight in air: higher than 1 kg/m and/or lower than 5 kg/m (e.g. 3 kg/m); and/or Weight in water: substantially 0 kg/m (nominal).

Example functionalities of the depth control system that can be implemented include any or a combination of the following:

Positioning receiver cables at desired immersion depth. By default, desired depth is constant along the cable, constant over time, and all cables have the same target value. For specific needs, target immersion depth might vary along a cable (immersion profile), might be different from one cable to another, and may vary with time.

Maintaining immersion depth/profile as close as possible from target values (counteracting average current).

Bringing cables up to the surface for specific operations (section replacement, component failure).

Individually controlling each cable, especially during launch and recovery procedure, displacements between acquisition stations, transits to and from the zone to be prospected. Cable depth control may be controlled in manual or automatic mode.

Verifying depth control system status, comparing actual cable depth vs. desired depth, and generating alarms in case of abnormal status.

An example lead-in depth control system equipment may comprise any or a combination of the following:

Mechanical winches to reel in or pay out lead in cables.

Lead-in depth control systems controlling the depth of lead-in extremities. The system includes depth sensors, current measuring sensors (ADCP), speed sensors (GPS), winch speed sensors, paid out length sensors.

A lead-in depth controller onboard each drone able to action the winch.

A lead-in depth controller onboard master vessel to control the local controllers onboard the ARV.

Computer workstations onboard master vessel with a control screen to supervise the depth of all MSCs.

The automatic algorithm may indeed be implemented in the controller onboard the ARV and/or onboard the master vessel (distributed system). The controllers may have a manual mode to control the actuators manually. The controller may have an emergency mode to bring cable to surface. The controller architecture may thus include a central system onboard master vessel with delocalized units in the ARV: some of the intelligence located in the ARV.

When the control loop is run by a processor on board of at least one ARV (e.g. a processor running a control loop onboard of each ARV and controlling the respective winch of the ARV), the varying S30 can be performed more responsively (quick feedback control). Indeed, sensors of the seismic cable (e.g. depth sensors) may send information faster to the ARV (than to the master vessel), e.g. via electrical connections/cables, and the processor may control the winch faster, e.g. via electrical connections/cables. This relatively avoids the relative slowness of radio communications.

In examples, the current (w/R) speed can be obtained by subtracting drone water (d/R) speed (obtained with ADCP measurements) from drone absolute speed (d/w):

$$\vec{v}_{w/R} = \vec{v}_{d/R} - \vec{v}_{d/w}$$

In examples, ARV absolute speed is obtained through GPS, Doppler loch, or interface with the navigation system (system merging data and various sensors to accurately position the cable).

As the ARVs may pay out or reel in varying lengths of lead-in cable, the drones may be designed in a specific way, and in an example in the way described by the patent application entitled (at least when filed) "Water surface drone" and filed in the same country, by the person, and on the same date as the earliest patent application whose priority is claimed by the present patent application, if any, or as the present patent application otherwise (the content thereof being incorporated herein by reference).

Figure 13:
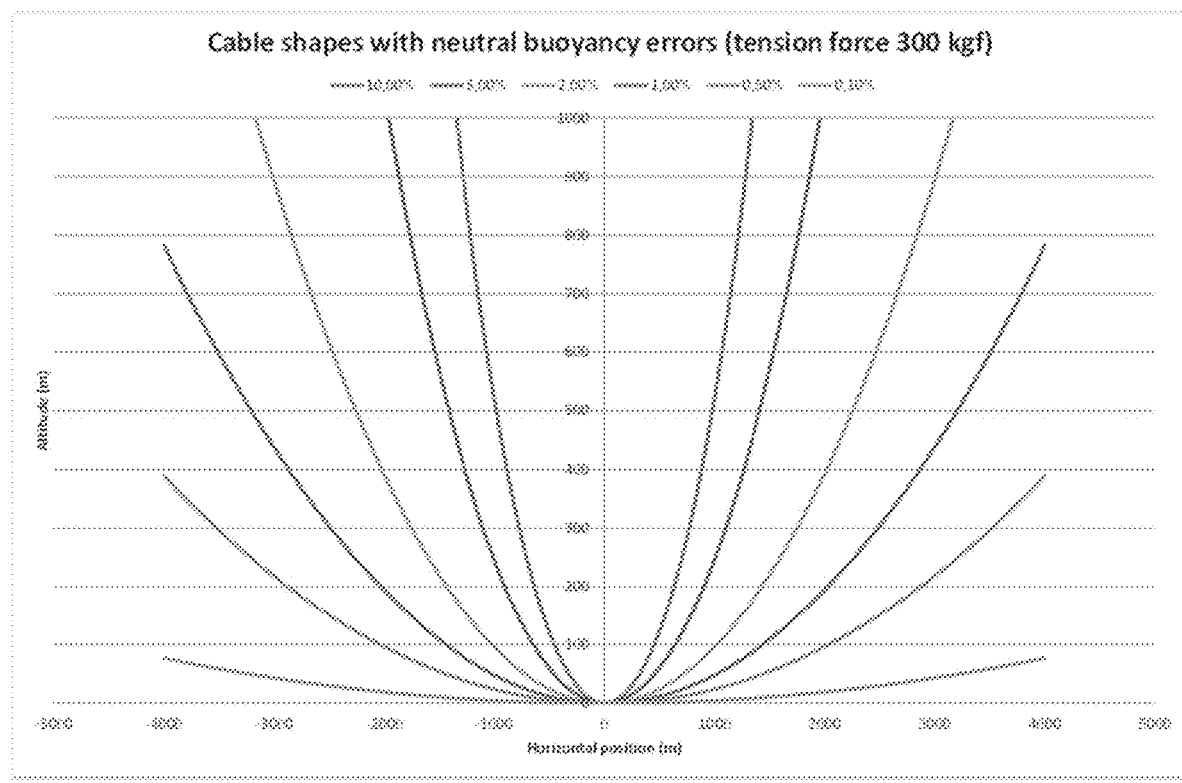
Figure 14:
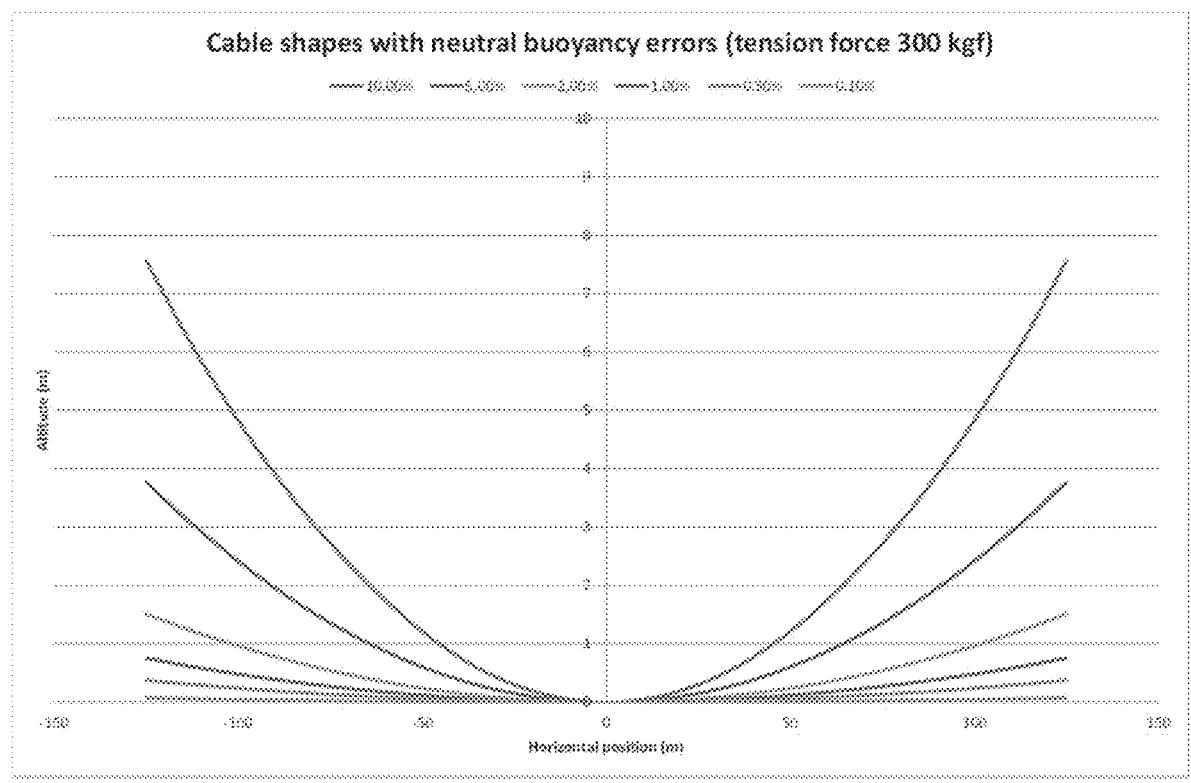

FIGS. 13-14 highlight the efficiency of the method, notably regarding the exerted tension on the cable to minimize a global error along the cable. The global depth error along the cable can be expressed via the equation of a catenary. The curve has a hyperbolic cosine shape. If $\rho$ is the notation of the linear density of the cable in water and T the horizontal traction of the vessels, the curve equation is $y=(\cos h(\mu \cdot x)-1)/\mu$; with $\mu=\rho/T$. FIGS. 13 and 14 show shapes of the cable for different levels of buoyancy error for a length of respectively 8 km (FIG. 13) and 250 m (FIG. 14), the former corresponding for example to the whole cable length and the latter corresponding for example to the local length of the cable around one defective ballast. The figures correspond to a 60 mm diameter cable and to a sea density of 1025 kg/m³. The buoyancy error represents the difference between the optimal weight to have a neutral buoyancy and the true weight. After computations, one can directly obtain the sag value: $h=\{sqrt(1+L^2 \cdot \mu^2)-1\}/\mu$; with L being the half of the length of the cable. The below table provides sag values for different tensions and for a length of 8 km and one of 250 m. The results show the efficiency of exerting a tension on the cable.

any or both of the surface autonomous vessels via the lead-in cables or any combination of varying the deployed length of any or both of the lead-in cables and varying the tension exerted on the seismic cable by any or both of the surface autonomous vessels via the lead-in cables, wherein varying the deployed length of each lead-in cable and/or the tension exerted on the cable by each respective surface autonomous vessel is performed via a control loop taking as input data including a measurement of depth of the seismic cable.

2. The method of claim 1, wherein the tension minimizes a global error relative to the target depth along the cable.

3. The method of claim 1, wherein varying the deployed length of each lead-in cable is performed independently for each lead-in cable.

4. The method of claim 1, wherein the measurement of depth of the seismic cable is a set of depth values determined via sensors arranged along the seismic cable.

5. The method of claim 4, wherein the sensors comprise pressure sensors linked to the ballasts, and/or pressure sensors provided midway for each cable section between two consecutive ballasts.

6. The method of claim 1, wherein the input data of the control loop further include measurements of the deployed length of each lead-in cable.

7. The method of claim 1, wherein varying the deployed length of each lead-in cable and/or the tension exerted on the cable by each respective surface autonomous vessel is performed by a respective winch arranged on each respective autonomous recording vessel, and the control loop controls each respective winch.

8. The method of claim 7, wherein the input data of the control loop further include measurements of each winch speed, state of winch end switches, and/or measurements of mechanical tension in each winch.

9. The method of claim 1, wherein the input data of the control loop further include current measurements, current forecast, and/or values relative to sea density.

10. The method of claim 1, wherein the input data of the control loop further include measurements of mechanical tension in the seismic cable.

|  | Buoyancy error | | | | | |
|---|---|---|---|---|---|---|
| Sag value | 10.00% | 5.00% | 1.00% | 0.80% | 0.50% | 0.10% |
| 8 km and T = 100 kgf | 3669.80 m | 3368.99 m | 2630.95 m | 1832.10 m | 1075.45 m | 231.08 m |
| 8 km and T = 300 kgf | 3096.62 m | 2433.71 m | 1365.53 m | 745.95 m | 382.88 m | 77.25 m |
| 8 km and T = 1000 kgf | 1832.10 m | 1075.45 m | 457.63 | 231.08 m | 115.83 m | 23.18 m |
| 250 m and T = 100 kgf | 21.94 m | 11.23 m | 4.52 m | 2.26 m | 1.13 m | 0.23 m |
| 250 m and T = 300 kgf | 7.52 m | 3.77 m | 1.51 m | 0.75 m | 0.38 m | 0.08 m |
| 250 m and T = 1000 kgf | 2.26 m | 1.13 m | 0.45 m | 0.23 m | 0.11 m | 0.02 m |

The invention claimed is:

1. A method for controlling depth of a seismic cable at depths greater than five meters, the seismic cable having ballasts spaced apart along a length of the seismic cable and providing a neutral buoyancy to the seismic cable, the seismic cable being adapted for midwater data acquisition, each end of the seismic cable being connected to a respective surface autonomous vessel exerting tension on the cable through a respective lead-in cable having a negative buoyancy, and each surface autonomous vessel being configured to vary the deployed length of the respective lead-in cable and the tension exerted on the cable via the respective lead-in cable, the method comprising, with respect to a target depth, varying the deployed length of any or both of the lead-in cables or the tension exerted on the seismic cable by 11. The method of claim 1, wherein the control loop is run by a processor on board of at least one autonomous recording vessel.

12. The method of claim 1, wherein the target depth is received from a distant master vessel.

13. A non-transitory computer-readable medium having recorded thereon a computer program comprising instructions for performing a method for controlling depth of a seismic cable at depths greater than five meters, the seismic cable having ballasts spaced apart along a length of the seismic cable and providing a neutral buoyancy to the seismic cable, the seismic cable being adapted for midwater data acquisition, each end of the seismic cable being connected to a respective surface autonomous vessel exerting tension on the seismic cable through a respective lead-in cable having a negative buoyancy, each surface autonomous vessel being configured to vary the deployed length of the respective lead-in cable and the tension exerted on the seismic cable via the respective lead-in cable the method comprising, with respect to a target depth, varying the deployed length of any or both the lead-in cables or the tension exerted on the seismic cable by any or both the surface autonomous vessels via the lead-in cables or any combination of varying the deployed length of any or both of the lead-in cables and varying the tension exerted on the seismic cable by any or both of the surface autonomous vessels via the lead-in cables, wherein varying the deployed length of each lead-in cable and/or the tension exerted on the cable by each respective surface autonomous vessel is performed via a control loop taking as input data including a measurement of depth of the seismic cable.

14. An apparatus, comprising: a first autonomous vessel adapted to be linked to a seismic cable and to control a depth of the seismic cable according to a method for controlling depth of a seismic cable at depths greater than five meters, the seismic cable having ballasts spaced apart along a length of the seismic cable and providing a neutral buoyancy to the seismic cable, the seismic cable being adapted for midwater data acquisition, each end of the seismic cable being connected to a respective surface autonomous vessel exerting tension on the seismic cable through a respective lead-in cable having a negative buoyancy, each surface autonomous vessel being configured to vary the deployed length of the respective lead-in cable and the tension exerted on the seismic cable via the respective lead-in cable the method comprising, with respect to a target depth, varying the deployed length of any or both the lead-in cables or the tension exerted on the seismic cable by any or both the surface autonomous vessels via the lead-in cables or any combination of varying the deployed length of any or both of the lead-in cables and varying the tension exerted on the seismic cable by any or both of the surface autonomous vessels via the lead-in cables, wherein varying the deployed length of each lead-in cable and/or the tension exerted on the cable by each respective surface autonomous vessel is performed via a control loop taking as input data including a measurement of depth of the seismic cable.

15. The apparatus according to claim 14, further comprising a second autonomous vessel adapted to be linked to a seismic cable and to control depth of the seismic cable according to a method for controlling depth of a seismic cable having ballasts spaced apart along its length and providing a neutral buoyancy to the seismic cable.

16. The apparatus according to claim 15, further comprising a distant master vessel in communication with the first autonomous vehicle and the second autonomous vehicle and configured to send a respective target depth to one or more of the first autonomous vehicle and the second autonomous vehicle.

17. A system for controlling depth of a seismic cable having ballasts spaced apart along a length of the seismic cable and providing a neutral buoyancy to the seismic cable, the seismic cable being adapted for midwater data acquisition, each end of the seismic cable being connected to a respective surface autonomous vessel exerting tension on the seismic cable through a respective lead-in cable having a negative buoyancy, the system comprising a winch arranged on each vessel for connecting the respective lead-in cable to the vessel, said winch being operable to vary the length of the respective lead-in cable between the winch and the respective end of the seismic cable wherein varying the deployed length of each lead-in cable and/or the tension exerted on the cable by each respective surface autonomous vessel is performed via a control loop taking as input data including a measurement of depth of the seismic cable.

18. The system of claim 17, further comprising pressure sensors provided midway for each cable section between two consecutive ballasts.

19. The method of claim 1, wherein the seismic cable is operated at depths smaller than three hundred meters.

* * * * *